United States Patent Office 3,065,049
Patented Nov. 20, 1962

3,065,049
PREPARATION OF PURE TITANATES
Willard S. Bundy, Floral Park, N.Y., assignor to Barium and Chemicals, Inc., Willoughby, Ohio, a corporation of Ohio
No Drawing. Filed Oct. 7, 1955, Ser. No. 539,278
6 Claims. (Cl. 23—51)

This invention relates to the preparation of pure titanates and, for example, to the production of barium titanate from methyl titanate and barium methylate.

The general object of the invention is to produce exceptionally pure titanates from organic titanium and alkali and alkaline earth metal compounds.

Another object of the invention is to produce barium titanate.

Another object of the invention is to provide an easily practiced, efficient method of producing barium titanates and similar materials from alcoholates.

The foregoing and other objects and advantages of the invention will be made more apparent as the specification proceeds.

The present invention generally relates to a method of producing titanates comprising refluxing a titanium alcoholate with an alcoholate of groups I and II elements to form a metal titanate precipitate and an ether, cooling the refluxed material, filtering the material to obtain the metal titanate, washing the metal titanate with an alcohol, and drying the resultant pure titanate.

The invention is especially adapted to be practiced with use of anhydrous methyl titanate which may be produced as set forth in my co-pending application Serial Number 539,277, now abandoned, and with anhydrous barium methylate that may be prepared as set forth in a second co-pending application Serial Number 539,276, now abandoned. However, the methyl titanate and/or anhydrous barium methylate used are not to be restricted to these particular methods of preparation, and may be otherwise obtained if desired.

As one example of the invention, stoichiometric quantities of an anhydrous methyl alcohol solution of methyl titanate is refluxed with an anhydrous methyl alcohol solution of barium methylate to produce:

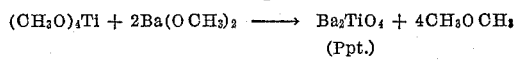

$(CH_3O)_4Ti + 2Ba(OCH_3)_2 \longrightarrow Ba_2TiO_4 + 4CH_3OCH_3$
(Ppt.)

The mixture is refluxed where upon substantially all the titanium is precipitated as barium titanate and is separated from the methyl alcohol by filtration. The separated barium titanate is washed on the filter with fresh methyl alcohol to remove any excess of original reactants. After drying, the material is ready for use or sale.

Any material capable of withstanding the corrosive effects of the reactants is suitable for the necessary equipment. For high purity product, equipment fabricated from stainless steel is preferred.

Preparation of the meta and other titanates is controlled by the reaction proportions and mode of mixing the reactants.

It will be realized that any suitable alcoholates of barium and titanium may be used in practice of the invention, and different alcoholates of barium and titanium may be used at one time if desired.

Anhydrous alcohol solutions of the materials are used in the action since water is detrimental to the process causing either a polymerization of the organic titanate or its complete hydrolysis to $TiO_2$.

Corresponding compounds of the alkaline earth elements calcium, strontium, magnesium, beryllium and radium may be used like the barium alcoholate mentioned, while similar compounds of the alkali elements lithium, sodium, potassium, rubidium and cesium may also be used.

In view of the foregoing, it is believed that the objects of the invention have been achieved.

While one complete embodiment of the invention has been disclosed herein, it will be appreciated that modification of this particular embodiment of the invention may be resorted to as indicated in the specification without departing from the scope of the invention as defined in the appended claims.

What is claimed is:

1. A method of producing barium titanates comprising refluxing methyl titanate with barium methylate to form a barium titanate precipitate, cooling the refluxed material, filtering the material to obtain the barium titanate, washing the barium titanate with methyl alcohol, and drying the resultant pure barium titanate.

2. A method of producing barium titanates comprising refluxing a titanium alcoholate with a barium alcoholate to form a barium titanate precipitate, cooling the refluxed material, filtering the material to obtain the barium titanate, washing the barium titanate with an alcohol, and drying the resultant pure barium titanate.

3. A method of producing barium titanates comprising refluxing a titanium alcoholate with a barium alcoholate to form a barium titanate precipitate, and removing the precipitate to obtain the barium titanate.

4. A method of producing barium titanates comprising refluxing methyl titanate with barium methylate to form a barium titanate precipitate, and filtering the material to obtain the barium titanate.

5. A method of producing barium titanates comprising refluxing an anhydrous titanium alcoholate with an anhydrous barium alcoholate to form a barium titanate precipitate, cooling the refluxed material, filtering the material to obtain the barium titanate and washing the barium titanate with an alcohol.

6. A method of producing barium titanate by reacting stoichiometric quantities of an anhydrous alcohol solution of a titanium alcoholate and a barium alcoholate at an elevated temperature to cause the precipitation of barium titanate and recovering the said barium titanate.

References Cited in the file of this patent

FOREIGN PATENTS 332,605    Great Britain _____ July 22, 1930